(12) United States Patent
Kalaidjian

(10) Patent No.: US 8,504,985 B2
(45) Date of Patent: Aug. 6, 2013

(54) CONTEXT SENSITIVE SCRIPT EDITING FOR FORM DESIGN

(75) Inventor: Alex Kalaidjian, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 895 days.

(21) Appl. No.: 12/387,379

(22) Filed: Apr. 30, 2009

(65) Prior Publication Data

US 2013/0174120 A1    Jul. 4, 2013

(51) Int. Cl.
*G06F 9/44* (2006.01)
*G06F 3/048* (2006.01)

(52) U.S. Cl.
USPC .......................................... 717/113; 715/808

(58) Field of Classification Search
USPC ................................. 717/113, 808
See application file for complete search history.

(56) References Cited

U.S. PATENT DOCUMENTS

| | | | | |
|---|---|---|---|---|
| 4,813,013 | A * | 3/1989 | Dunn | 715/763 |
| 6,026,233 | A * | 2/2000 | Shulman et al. | 717/113 |
| 6,078,743 | A * | 6/2000 | Apte et al. | 717/100 |
| 6,337,696 | B1 * | 1/2002 | Lindhorst et al. | 715/763 |
| 6,484,261 | B1 * | 11/2002 | Wiegel | 726/11 |
| 6,701,513 | B1 * | 3/2004 | Bailey | 717/109 |
| 6,851,089 | B1 * | 2/2005 | Erickson et al. | 715/255 |
| 7,191,405 | B1 * | 3/2007 | Jaramillo | 715/763 |
| 7,197,744 | B2 * | 3/2007 | Hostettler | 717/125 |
| 7,434,207 | B2 * | 10/2008 | Spencer | 717/125 |
| 7,739,611 | B2 * | 6/2010 | Hirschberg et al. | 715/762 |
| 7,958,454 | B2 * | 6/2011 | Gaudette | 715/763 |
| 2003/0037069 | A1 * | 2/2003 | Davison | 707/200 |
| 2004/0179017 | A1 * | 9/2004 | Martyn et al. | 345/536 |
| 2004/0189708 | A1 * | 9/2004 | Larcheveque et al. | 345/780 |
| 2007/0061741 | A1 * | 3/2007 | Kothari et al. | 715/762 |
| 2008/0189682 | A1 * | 8/2008 | Rude | 717/111 |
| 2008/0195969 | A1 * | 8/2008 | Brown et al. | 715/802 |
| 2009/0158134 | A1 * | 6/2009 | Wang et al. | 715/222 |

OTHER PUBLICATIONS

Adding Controls Using Visual Studio, BrainBell.com (Published May 10, 2006), retrieved from http://web.archive.org/web/20060510071550/http://www.brainbell.com/tutorials/ASP/Adding_Controls_Using_Visual_Studio.html.*
WinForms—Microsoft Visual Studio, Mar. 6, 2009.
Adobe LiveCycle Designer—[Purchase Order Dynamic.xdp], Mar. 6, 2009.

* cited by examiner

Primary Examiner — Don Wong
Assistant Examiner — Theodore Hebert
(74) Attorney, Agent, or Firm — Kilpatrick Townsend & Stockton LLP

(57) ABSTRACT

Context sensitive script editing for form design is provided. In some embodiments, context sensitive script editing for form design includes receiving an indication to display a script editing interface, in which the indication includes a selected object within a sub-window of an editing application; obtaining a script associated with the selected object; and displaying a pop-up window that includes the script associated with the selected object, in which the pop-up window is displayed within the sub-window.

20 Claims, 12 Drawing Sheets

CONTEXT SENSITIVE SCRIPT EDITING FOR FORM DESIGN

BACKGROUND OF THE INVENTION

Editors exist for form design. Forms generally include objects (e.g., data entry fields, summation or other calculation fields, buttons, etc.) that can have associated script (e.g., executable instructions in the form of a scripting language that can be executed/interpreted to perform specified actions/operations). Editors for form design generally provide for script editing. For example, editors exist that provide for script editing for form design.

BRIEF DESCRIPTION OF THE DRAWINGS

Various embodiments are disclosed in the following detailed description and the accompanying drawings.

DETAILED DESCRIPTION

Various embodiments can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the various approaches of the various embodiments disclosed herein may take, may be referred to as techniques. In general, the order of the steps of disclosed processes may be altered within the scope of the techniques. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the techniques. The techniques are described in connection with such embodiments, but the techniques are not limited to any embodiment. The scope of the techniques is limited only by the claims and the techniques encompass numerous alternatives, modifications and equivalents. Numerous specific details are set forth in the following description in order to provide a thorough understanding of the techniques. These details are provided for the purpose of example and the techniques may be practiced according to the claims without some or all of these specific details. For the purpose of clarity, technical material that is known in the technical fields related to the techniques has not been described in detail so that the techniques are not unnecessarily obscured.

Figure 2:
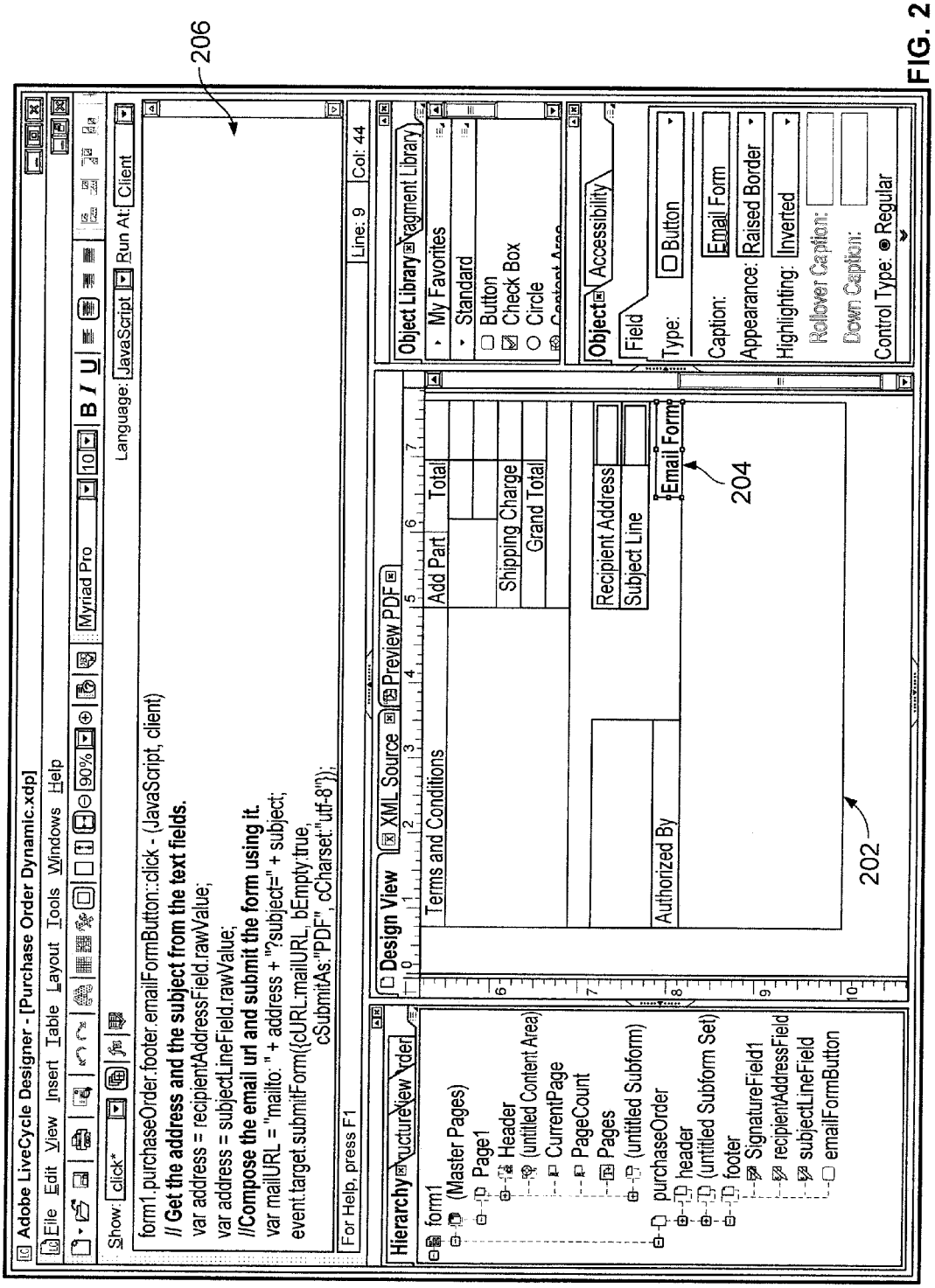
FIG. 2 is a screen shot illustrating an existing script editor for form design.

As shown in FIG. 2, script editors exist that provide for entering script for form objects 204 in a conventional, manually located and sized window, which is provided in a separate window 206 that is independent separate of the main canvas window 202 of a form design application. Events can be selected using a drop-down menu and events with script associated with them are marked with, for example, an asterisk beside their name. However, in such script editors, the main canvas window 202 displaying the form being designed and/or edited is reduced in order to display a separate script editing window 206, thereby not allowing the user to view the entire or a broader view of the form being designed and/or edited. Moreover, it is difficult to identify the selected object 204 that is associated with script being edited and the actions associated with the selected object 204. For example, using the script editor as shown in FIG. 2 requires a user to divert their focus and context from the main canvas window 202, which is the central window where the layout of the form is created and form objects are manipulated. As shown, the script editor can require a significant portion of screen real estate. While the script editor is open, the view of the main canvas window 202 becomes smaller and less of the form and its objects can be seen. The script editor also takes away space from any other windows that may be open in the application (e.g., an object inspector and hierarchy view of an editing application (also referred to as an editor application)). In addition, opening and closing the script editor to see a larger view of the form is a time consuming and distracting task while editing such a form, especially if a user has to repeatedly open and close the script editor throughout the process of designing a form. What is needed is an improved script editor for form design.

Accordingly, context sensitive script editing for form design is provided that, for example, provides for a more efficient and intuitive context sensitive script editing for form design. In some embodiments, context sensitive script editing for form design includes receiving an indication to display a script editing interface, in which the indication includes a selected object within a sub-window (e.g., main canvas window) of an editing application (e.g., Adobe® LiveCycle® Designer or any other form design/editing application, such as Microsoft® Visual Studio®); obtaining a script (e.g., a script can be written in FormCalc, JavaScript, C++ or any other scripting or programming language) associated with the selected object; and displaying a pop-up window (e.g., script editing window) that includes the script associated with the selected object, in which the pop-up window is displayed within the sub-window.

Figure 1:
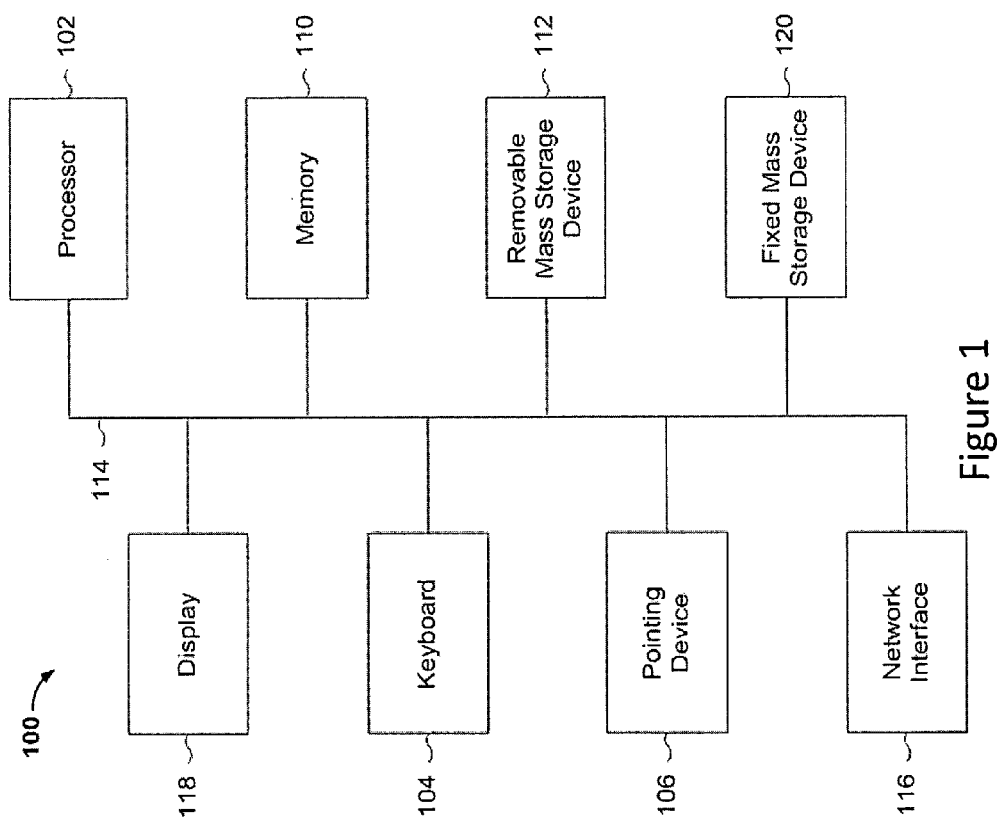
FIG. 1 is a functional diagram illustrating a programmed computer system for executing a script editor providing context sensitive script editing for form design in accordance with some embodiments.

FIG. 1 is a functional diagram illustrating a programmed computer system for executing a script editor providing context sensitive script editing for form design (e.g., executing an editing application for providing context sensitive script editing for form design) in accordance with some embodiments. As shown, FIG. 1 provides a functional diagram of a general purpose computer system programmed to perform context sensitive script editing for form design in accordance with some embodiments. As will be apparent, other computer system architectures and configurations can be used to perform context sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the context sensitive script editing for form design elements described below with respect to FIGS. 3 through 8 and/or executes/performs the processes described below with respect to FIGS. 9 through 12.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 3:
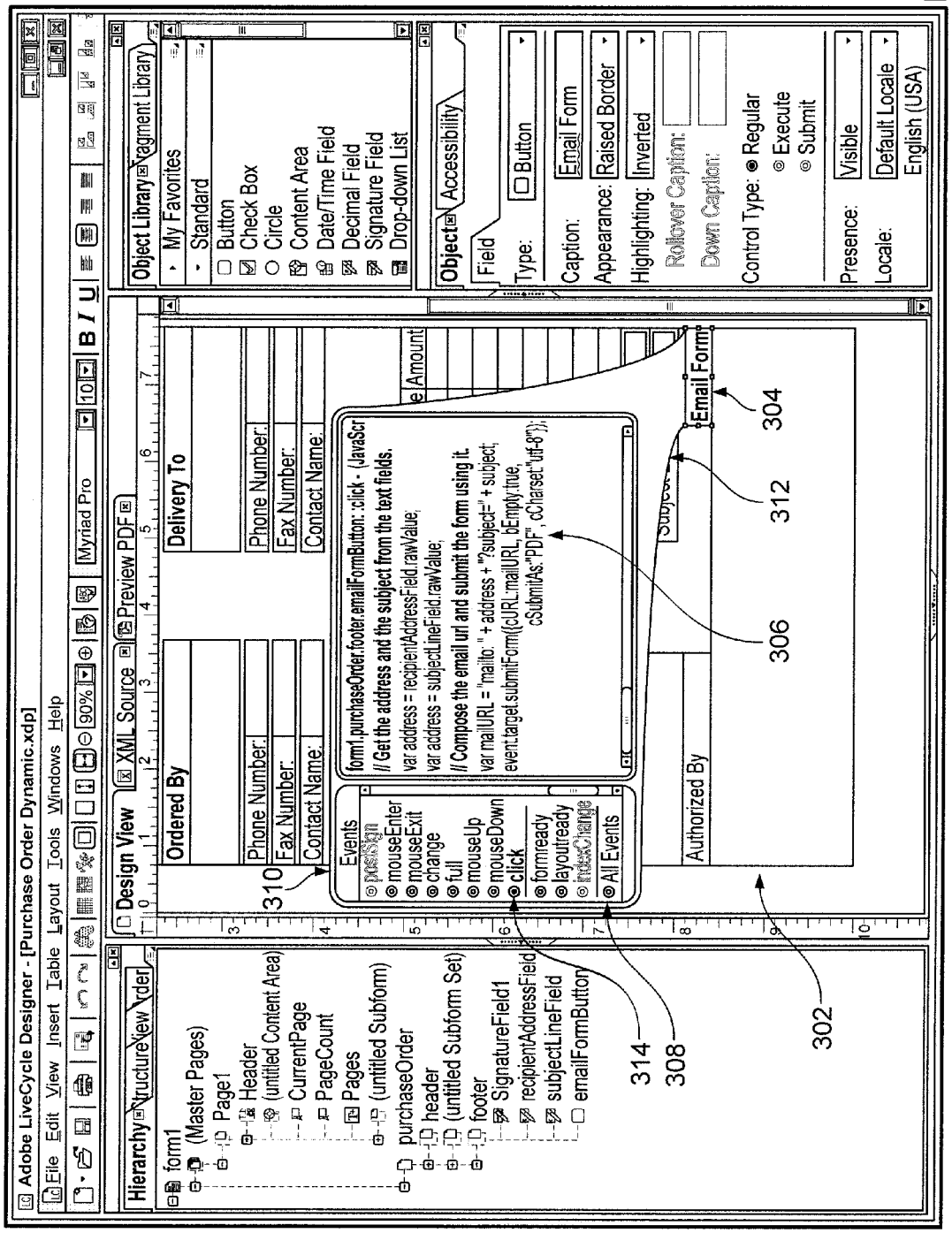
FIG. 3 is a screen shot illustrating a pop-up window for context sensitive script editing for form design in accordance with some embodiments.

FIG. 3 is a screen shot illustrating a pop-up window for context sensitive script editing for form design in accordance with some embodiments. In some embodiments, FIG. 3 illustrates a screen shot of a pop-up window for context sensitive editing for form design provided by an editing application executed on a programmed computer system (e.g., as shown in FIG. 1). As shown, a sub-window (e.g., a main canvas window) 302 displays a form for editing. For example, the editing application provides a main canvas window for designing a layout and objects (e.g., fields) for a form (e.g., an XML form, HTML form, or another type of form). A selected object 304 (an "Email Form" field of the form) is associated with a script 306, which can be edited. For example, script can add additional functionality to particular objects of a form and can also work with multiple objects to perform tasks across an entire form. A few examples of functionality that can be added to a form using script including: summing up the values of several fields and displaying the total in another field (e.g., a Total field), emailing a form to a user-defined email address (e.g., an Email Form field), and changing the background color of a field to be red to indicate that its current value is invalid. In some embodiments, the script 306 is automatically filled (populated) with a default or basic script (e.g., for certain objects, such as an Email Form field), which can then be edited using the pop-up window 310.

In some embodiments, the selected object is also associated with a set of events 308. As shown, the script 306 is displayed in a pop-up window 310 that also includes the selected event 314 and the set of events 308. The script 306 can be edited within the pop-up window 310. For example, the set of events 308 are displayed in an intuitive manner using a list format of the set of events that is provided within the pop-up window 310 and colors and/or selected buttons to denote the selected event(s) and which events have script associated with them, which makes it very easy to see which events have script associated with them in a quick glance.

In some embodiments, an event (e.g., event 314) is a scenario that happens with a form object (e.g., object 304) that can be triggered by user interaction or any other external happenings with the form. Examples of common events for button objects include the following: "Mouse Down", "Mouse Up" and "Click". Examples of common events for a text field include the following: "Value Changed", "Enter" and "Exit". For example, some events are common to any type of form objects, such as "Initialize", which occurs when a form is first loaded. In some embodiments, events can have actions assigned to them, which are performed or executed when such events occur. As described herein, actions can be defined using a script (e.g., script 306). Accordingly, associating a script with an event causes the resulting action of the script to be executed when the event occurs. For example, a script can include instructions to send an email (the action) and assign it to a button's "Click" event so that when a user clicks on the button in the form, the "Click" event occurs that triggers the associated script to execute and send the email. Similarly, a script can include instructions to change the color of a button to orange and assign it to the "Mouse Down" event to give the user visual feedback when the user clicks on the button. As another example, a script can include instructions to validate the contents of a text field and associate it with the "Value Changed" event so that every time a user changes the value of the field, a check is performed to ensure that it is in the proper format and possibly display visual feedback accordingly. As will be appreciated, various other associations of objects, events, and scripts can be provided with the scripts being edited to be customized for various forms and desired scenarios.

A link, or as shown, an arc connector, 312 graphically connects the selected object 304 with the pop-up window 310, which provides a visual cue of looking like the pop-up window 310 is attached to, or stems from, the selected object 304. As will be appreciated, various other links or connectors can be used to graphically depict that the pop-up window 310 is associated with the selected object 304 (e.g., using a single line as a connector, using two lines to connect the outer edges of the selected object 304 to the closest respective corners/sides of the pop-up window 310, using a transparent arc connector design (e.g., without any color fill), and/or other types of connectors/links). The script 306 and the set of events 308 associated with the selected object 304 are included in the pop-up window 310 displayed above the selected object 304 within the sub-window 302. For example, the pop-up window 310 provides a script editor for the script 306 associated with the selected object 304. As shown, the pop-up window 310 is opaque. In some embodiments, the pop-up window 310 is semi-transparent (e.g., to more easily see what is behind the pop-up window on the canvas). In some embodiments, the pop-up window 310 is completely transparent. In some embodiments, the pop-up window 310 is a dynamically displayed script editor window that is displayed when an object 302 is selected. In some embodiments, the pop-up window 310 can be dismissed or toggled off/closed based on an indication (e.g., user input using the editing application, invoked in any number of ways, such as a mouse gesture, a selection of an item in a context menu, a voice command, a touch screen input, and/or a keyboard shortcut).

In some embodiments, the pop-up window 310 includes a subset of the text of script 306 (e.g., when the number of lines of the script 306 exceeds that which can be displayed in the pop-up window as sized and located within the sub-window 302). In some embodiments, the pop-up window includes maintaining a previous zoom value and a previous scroll position within the displayed portion of the script 306. In some embodiments, the larger the number of lines of the script 306, the larger the pop-up window 310 will be, up to, for example, a predetermined or configured maximum size (e.g., constrained by the size of the sub-window 302 and/or screen display). The fewer the number of lines of the script 306, the smaller the pop-up window 310 will be, down to, for example, a predetermined or configured minimum acceptable size. In some embodiments, the pop-up window 310 can be manually resized (e.g., by dragging one of the corners of the pop-up window 310). For example, the size of the pop-up window 310 can further be determined based on a location of the pop-up window 310, as discussed below, and based on the available space within the sub-window 302 based on the selected location of the pop-up window 310 within the sub-window 302.

In some embodiments, the set of events 308 associated with the selected object 304 are displayed using a different color than events that are not associated with the selected object 304 (e.g., or displayed using some other indicator(s) to differentiate the associated events from the events that are not associated with the selected object, which, for example, can be grayed out, as shown in FIG. 3). In some embodiments, the selected event 314 (e.g., associated with the displayed script for editing in the pop-up window) is displayed with a graphical indicator (e.g., a selected button, as shown in FIG. 3).

In some embodiments, a size of the pop-up window 310 is automatically determined based on a number of lines of the script 306 associated with the selected object 304. In some embodiments, a default or minimum number of blank lines are included in pop-up window 310 (e.g., in case the user wants to add code or script to the script 306). In some embodiments, a location (placement) of the pop-up window 310 is automatically determined based on a size of the pop-up window 310 and a location of the selected object 304 within the sub-window or main canvas window 302. For example, the location (placement) of the pop-up window 310 can be determined based on whether the selected object 304 is in the upper half of the sub-window 302, and if so, locating the pop-up window 310 in the lower half of the sub-window 302. That is, in some embodiments, the scroll and/or zoom properties of sub-window 302 do not change before/after display of pop-up window 310. For example, this can be attractive in applications in which a visible shift or zoom in/out in sub-window 302 would be annoying or distracting to a viewer or user. Similarly, the location (placement) of the pop-up window 310 can be further determined based on whether the selected object 304 is in the left half of the sub-window 302, and if so, locating the pop-up window 310 in the right half of the sub-window 302.

Figure 4:
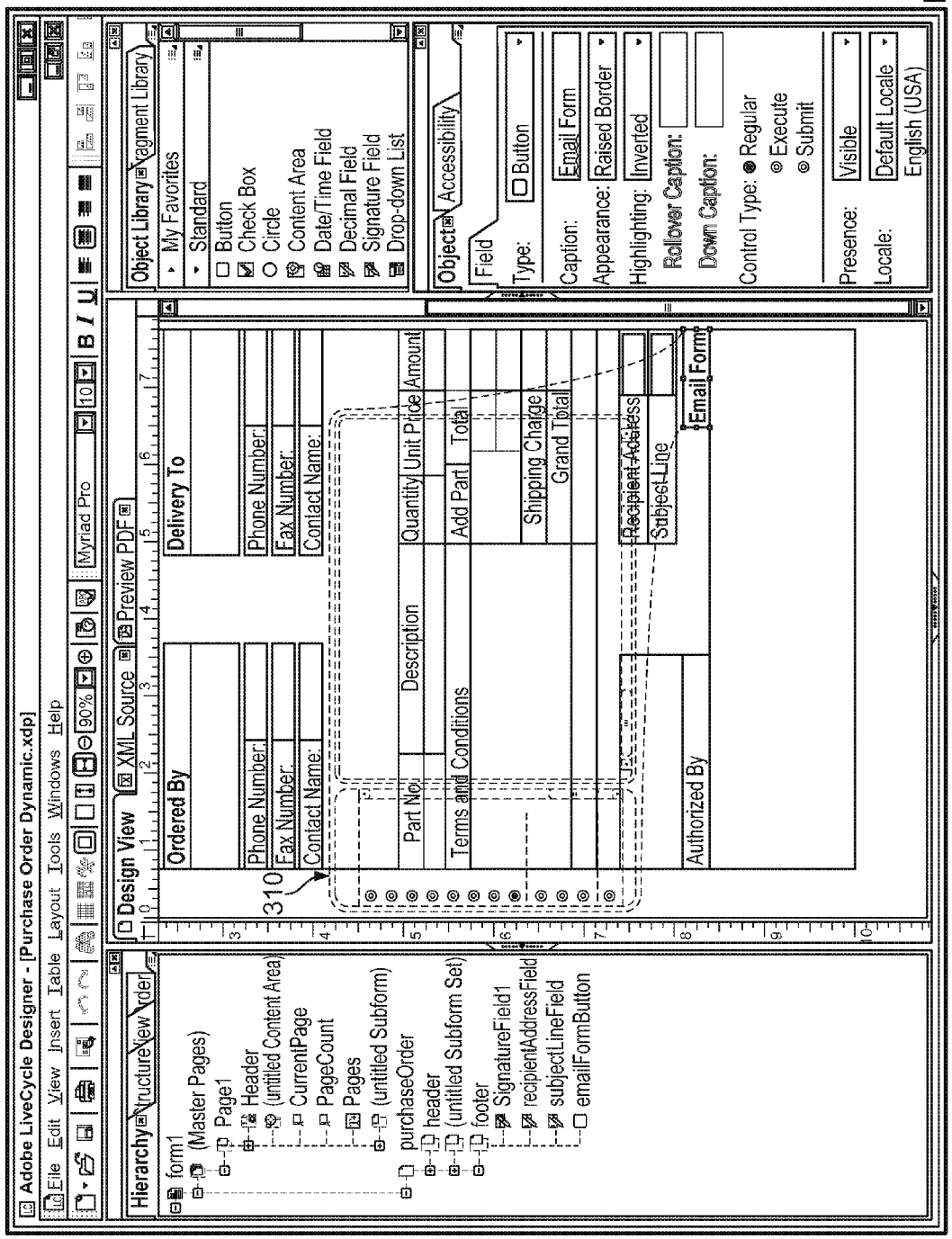
FIG. 4 is another screen shot illustrating a semi-transparent pop-up window for context sensitive script editing for form design in accordance with some embodiments.

FIG. 4 is another screen shot illustrating a semi-transparent pop-up window for context sensitive script editing for form design in accordance with some embodiments. As shown, FIG. 4 is similar to FIG. 3 except that the pop-up window 310 of FIG. 4 is shown as semi-transparent (as indicated by the dashed outline of the semi-transparent pop-up window 310, in which the contents of the pop-up window 310 are also visible to the user through the semi-transparent display of the pop-up window 310). In some embodiments, the pop-up window 310 can be selected for display as opaque or semi-transparent (e.g., based on a user indication, such as using a toggle button or an option selection, such as using a shortcut key or by right clicking on the pop-up window to bring up a context menu and selecting the desired appearance).

Figure 5:
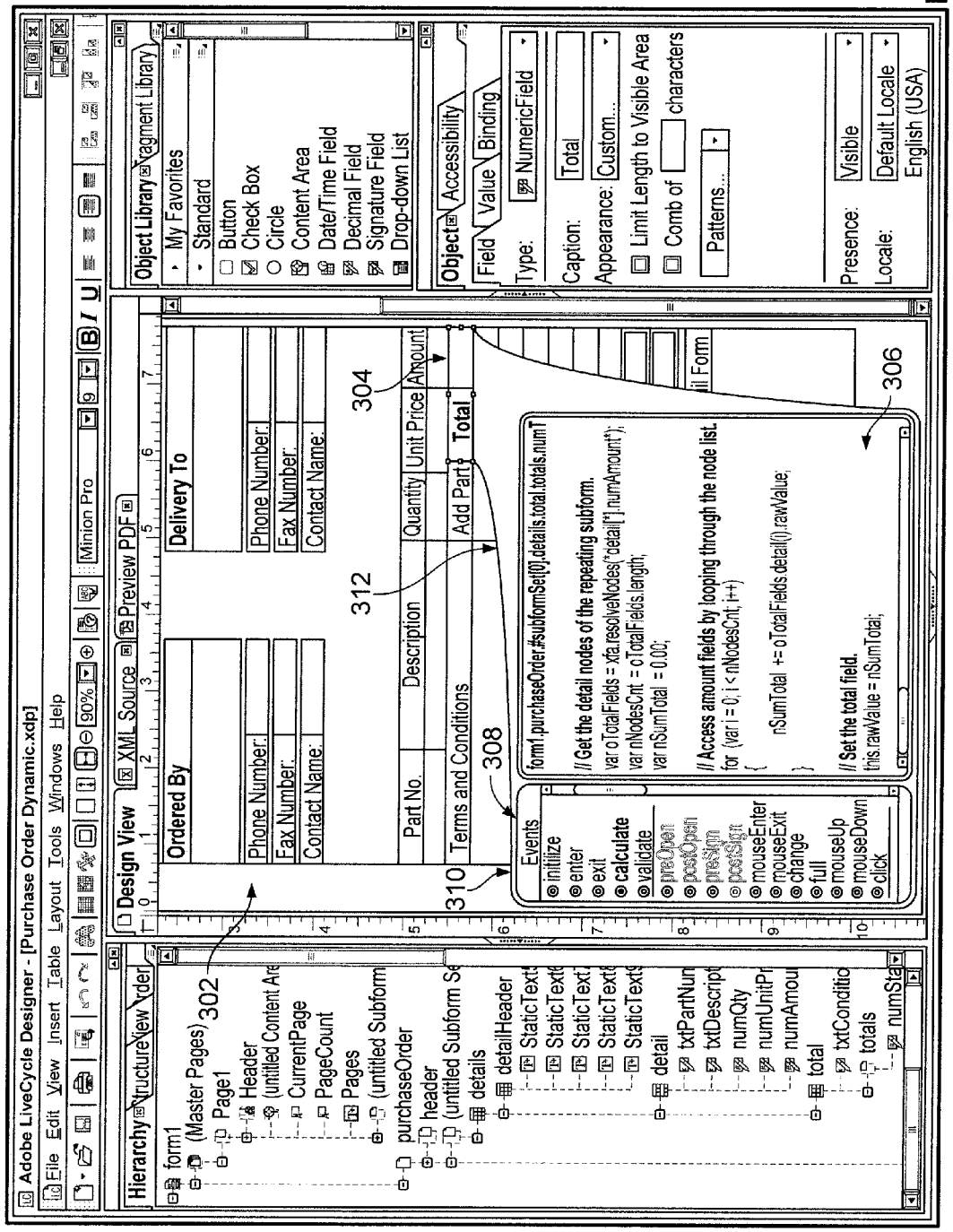
FIG. 5 is another screen shot illustrating a pop-up window for context sensitive script editing for form design in accordance with some embodiments.

FIG. 5 is another screen shot illustrating a pop-up window for context sensitive script editing for form design in accordance with some embodiments. As shown, a different object is 304 (a "Total" field of the form) is selected. The script 306 and the set of events 308 associated with the selected object 304 of FIG. 5 are included in the pop-up window 310 displayed below the selected object 304 within the sub-window 302. In this example, the arc connector 312 graphically connects the pop-up window 310 as depicted below the selected object 304.

Figure 6:
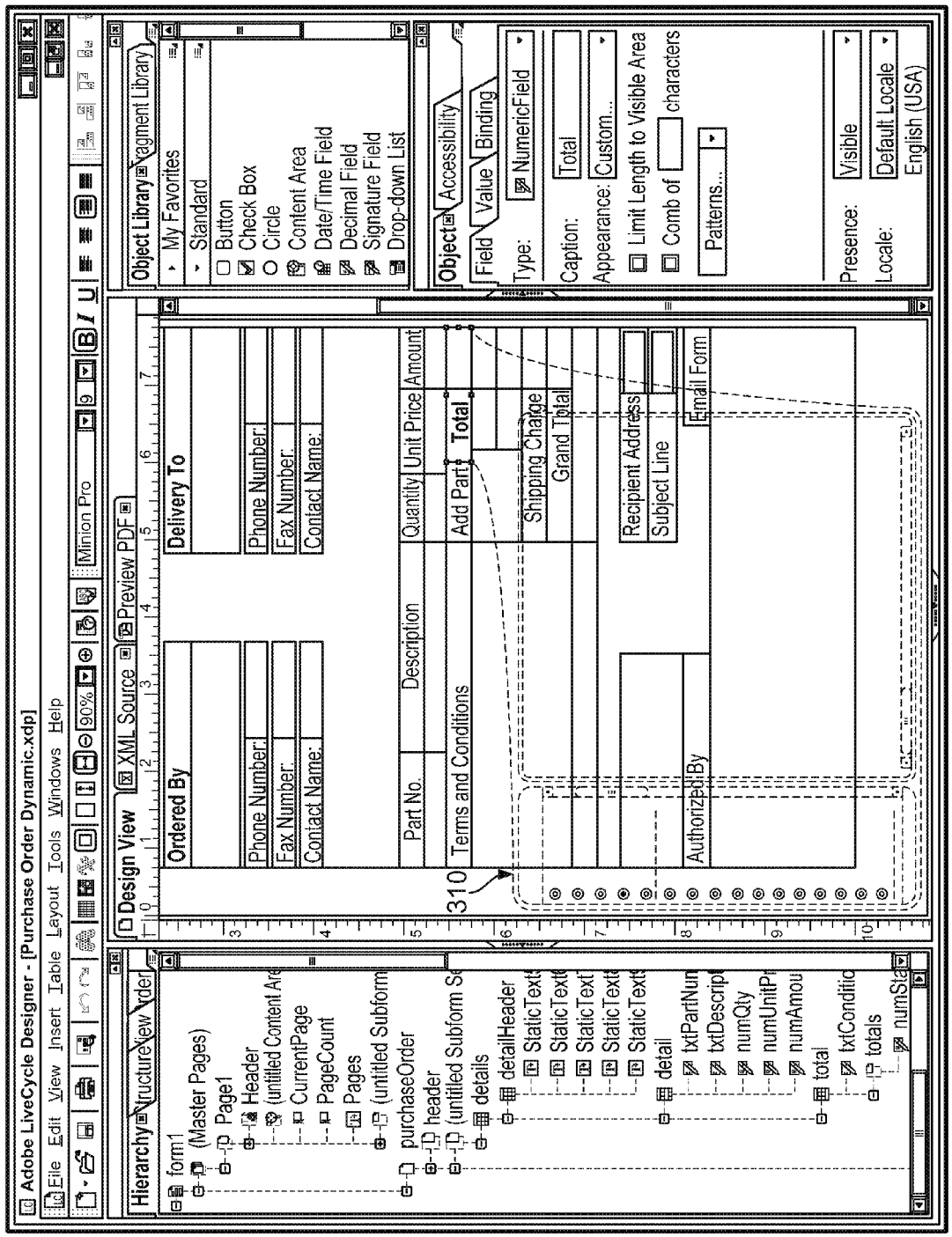
FIG. 6 is another screen shot illustrating a semi-transparent pop-up window for context sensitive script editing for form design in accordance with some embodiments.

FIG. 6 is another screen shot illustrating a semi-transparent pop-up window for context sensitive script editing for form design in accordance with some embodiments. As shown, FIG. 6 is similar to FIG. 5 except that the pop-up window 310 of FIG. 6 is shown as semi-transparent (as indicated by the dashed outline of the semi-transparent pop-up window 310, in which the contents of the pop-up window 310 are also visible to the user through the semi-transparent display of the pop-up window 310).

Figure 7:
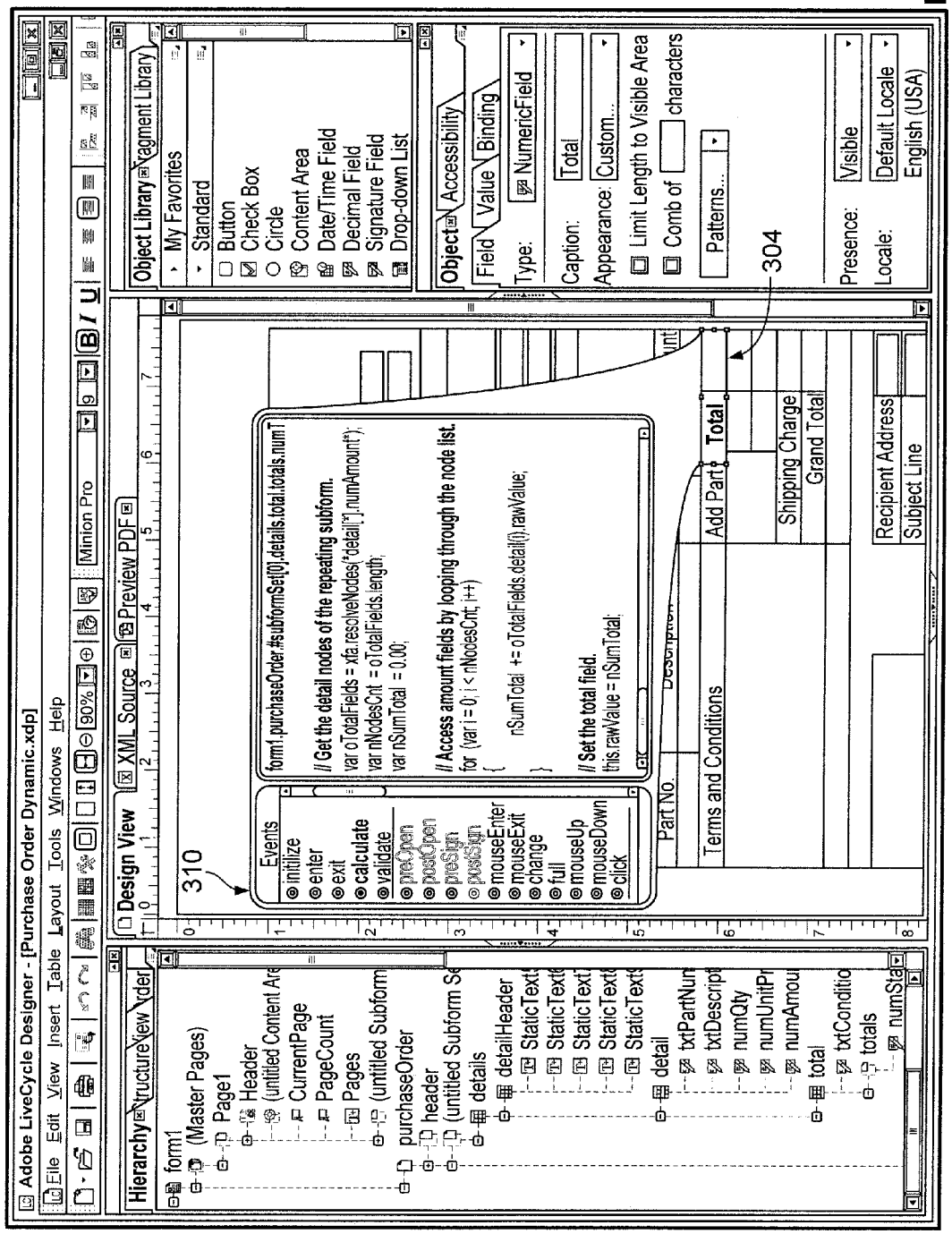
FIG. 7 is another screen shot illustrating a pop-up window for context sensitive script editing for form design in accordance with some embodiments.

FIG. 7 is another screen shot illustrating a pop-up window for context sensitive script editing for form design in accordance with some embodiments. As shown, FIG. 7 is similar to FIG. 5 except that the pop-up window 310 of FIG. 7 is shown within the pop-up window 310 above the selected object 304. Whereas the scroll position of sub-window 302 in FIGS. 5 and 6 is set so that the bottom of the form is displayed, the scroll position shown in FIG. 7 is set so that the top of the form is displayed.

Figure 8:
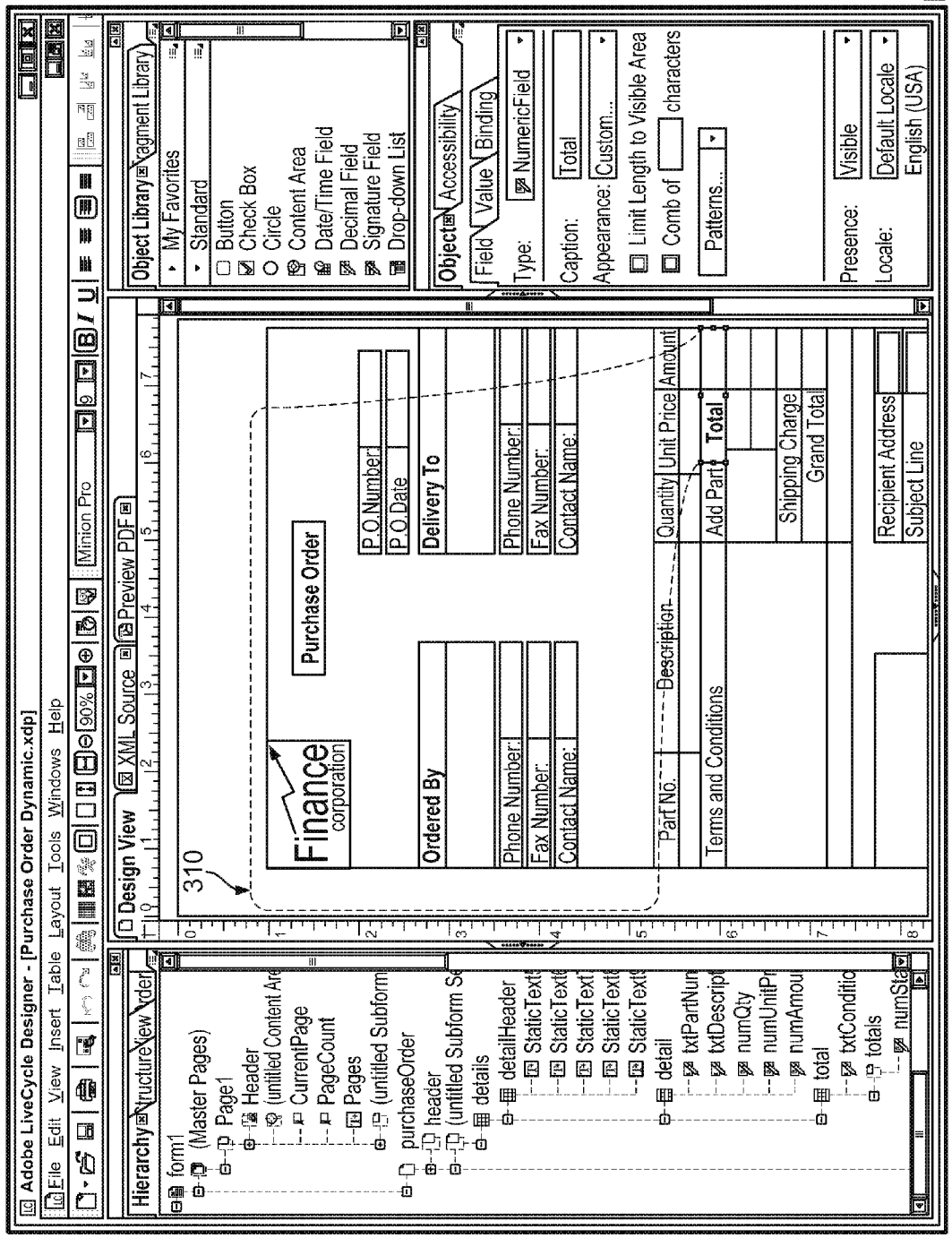
FIG. 8 is another screen shot illustrating a semi-transparent pop-up window for context sensitive script editing for form design in accordance with some embodiments.

FIG. 8 is another screen shot illustrating a semi-transparent pop-up window for context sensitive script editing for form design in accordance with some embodiments. As shown, FIG. 8 is similar to FIG. 7 except that the pop-up window 310 of FIG. 8 is shown as semi-transparent as indicated by the dashed outline of the semi-transparent pop-up window 310, in which the contents of the pop-up window 310 are also visible to the user through the semi-transparent display of the pop-up window 310).

Figure 9:
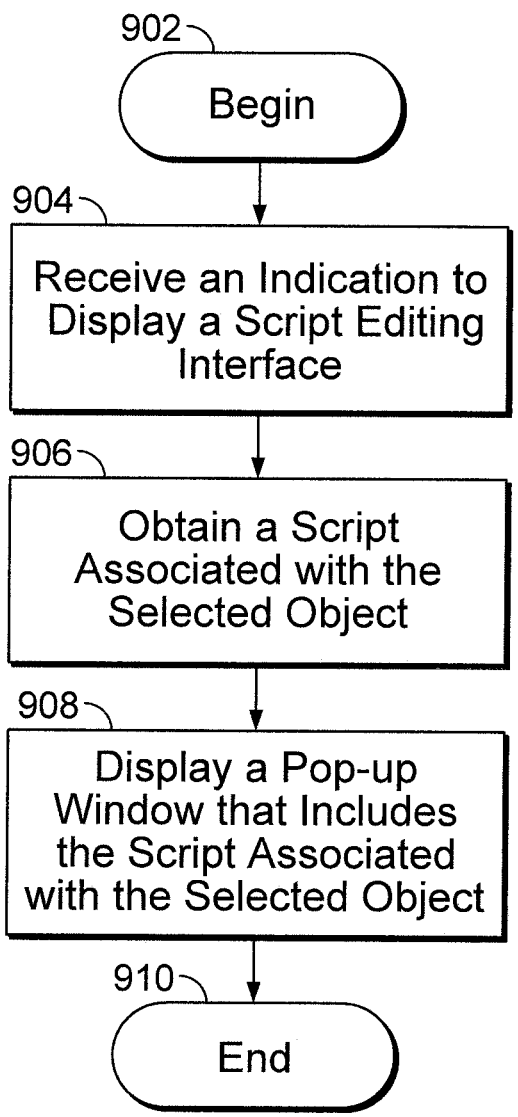
FIG. 9 is a flow chart for context sensitive script editing for form design in accordance with some embodiments.

FIG. 9 is a flow chart for context sensitive script editing for form design in accordance with some embodiments. At 902, the process is initiated. At 904, an indication to display a script editing interface is received (e.g., an indication can be triggered by a user of an editing application). In some embodiments, the indication includes a selected object within a sub-window of an editing application. In some embodiments, a form being edited includes a plurality of objects. In some embodiments, a form is edited using, for example, an editing application executed on a processor (e.g., implemented as executable instructions performed using a processor 102 and/or computer system 100). In some embodiments, a form being edited includes a plurality of objects. In some embodiments, the indication to display a script editing interface being received is performed using a processor (e.g., implemented as executable instructions performed using a processor 102 and/or computer system 100). At 906, a script associated with the selected object is obtained. In some embodiments, a form being edited includes a plurality of objects. In some embodiments, the script associated with the selected object being obtained is performed using a processor (e.g., implemented as executable instructions performed using a processor 102 and/or computer system 100). At 908, a pop-up window that includes the script associated with the selected object is displayed. In some embodiments, the pop-up window is displayed within (e.g., completely within) the sub-window. In some embodiments, the pop-up window is opaque. In some embodiments, some or all of the pop-up window is semi-transparent. In some embodiments, the pop-up window that includes the script associated with the selected object being displayed is performed using a processor (e.g., implemented as executable instructions performed using a processor 102 and/or computer system 100 for display on any computer display, such as a computer display that can display a graphical user interface). At 910, the process is completed. In some embodiments, a user is able to interact with information in a pop-up window (e.g., edit script presented in the pop-up window, save edited script, etc.) or the pop-up window itself (e.g., change size and/or position of pop-up window). After desired interaction is completed, in some embodiments, the user closes the pop-up window.

Figure 10:
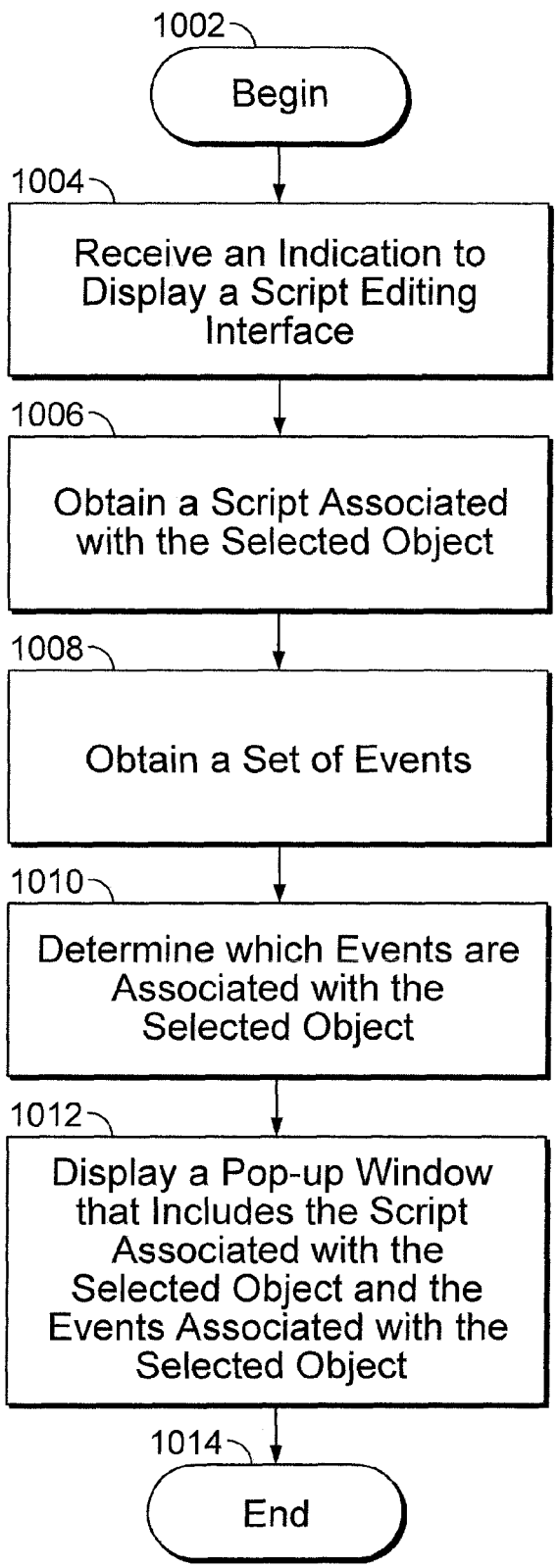
FIG. 10 is another flow chart for context sensitive script editing for form design in accordance with some embodiments.

FIG. 10 is another flow chart for context sensitive script editing for form design in accordance with some embodiments. At 1002, the process is initiated. At 1004, an indication to display a script editing interface is received. In some embodiments, the indication includes a selected object within a sub-window of an editing application. At 1006, a script associated with the selected object is obtained. At 1008, a set of events is obtained. At 1010, which events of the set of events are associated with the selected object is determined. At 1012, a pop-up window is displayed that includes the script associated with the selected object and the set of events associated with the selected object. In some embodiments, the set of events associated with the selected object are displayed using a different color or transparency than events that are not associated with the selected object (e.g., or displayed using some other indicator(s) to differentiate the associated events from the events that are not associated with the selected object, which, for example, can be grayed out, as shown in FIG. 3). In some embodiments, the selected event (e.g., associated with the displayed script for editing in the pop-up window) is displayed with a graphical indicator (e.g., as shown in FIG. 3). In some embodiments, a selected event is received (e.g., based on a user input), and the script 306 is associated with the selected event. In some embodiments, the selected event is determined based on a last-selected event. In some embodiments, the selected event is determined based on a first event in a hierarchy of events associated with the selected object. In some embodiments, the pop-up window is displayed within the sub-window. In some embodiments, the pop-up window includes maintaining a previous zoom value and a previous scroll position. At 1014, the process is completed.

Figure 11:
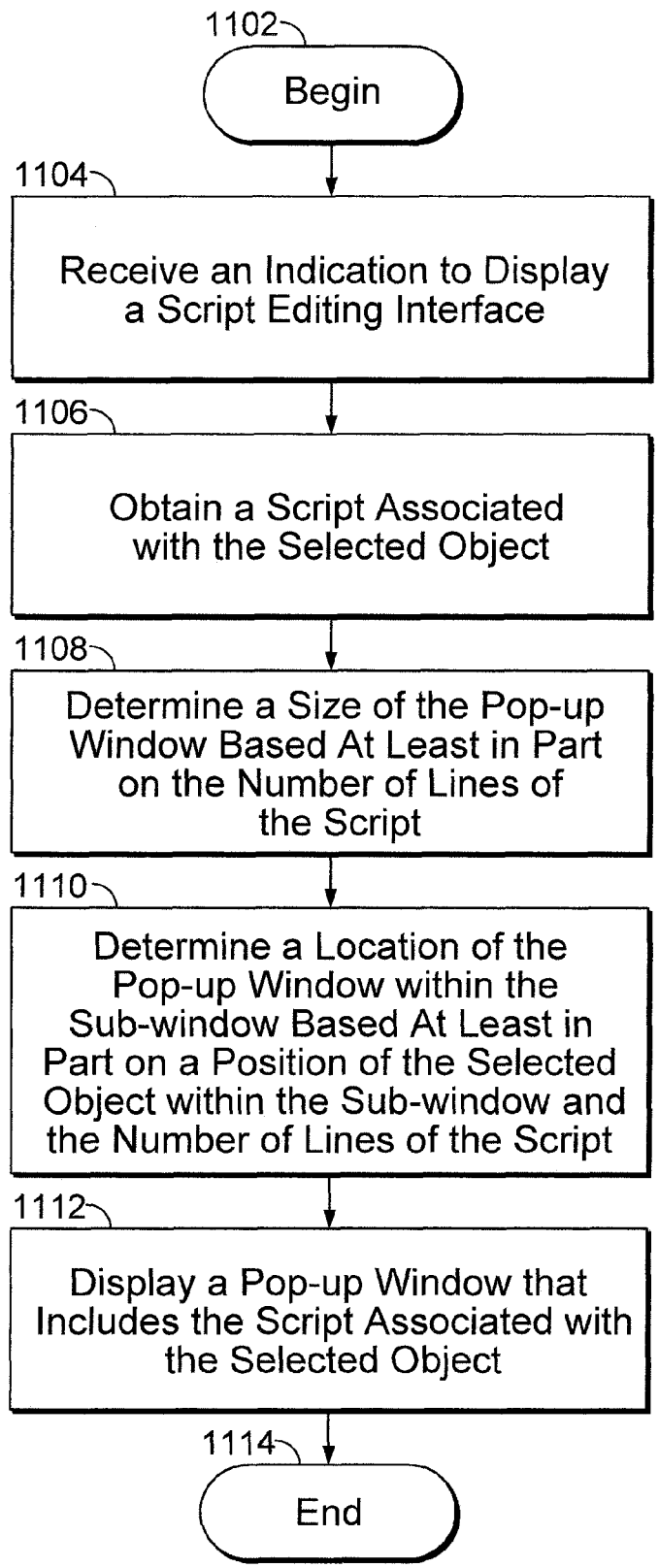
FIG. 11 is another flow chart for context sensitive script editing for form design in accordance with some embodiments.

FIG. 11 is another flow chart for context sensitive script editing for form design in accordance with some embodiments. At 1102, the process is initiated. At 1104, an indication to display a script editing interface is received. In some embodiments, the indication includes a selected object within a sub-window of an editing application. In some embodiments, a form being edited includes a plurality of objects. In some embodiments, a form is edited using, for example, an editing application executed on a processor. At 1106, a script associated with the selected object is obtained. At 1108, a size of the pop-up window is determined based at least in part on the number of lines of the script. At 1110, a location of the pop-up window within the sub-window is determined based at least in part on a position of the selected object within the sub-window and the number of lines of the script. For example, the pop-up window can be placed or positioned within the sub-window such that a sub-window does not appear to move or change (e.g., zoom in/out, move up/down/left/right, etc.) before and after display of the pop-up window. At 1112, a pop-up window that includes the script associated with the selected object is displayed. In some embodiments, the pop-up window is displayed within the sub-window. In some embodiments, a link between the pop-up window and the selected object is displayed. In some embodiments, the displayed link between the pop-up window and the selected object includes an arc connector (e.g., as shown in FIG. 3). At 1114, the process is completed.

Figure 12:
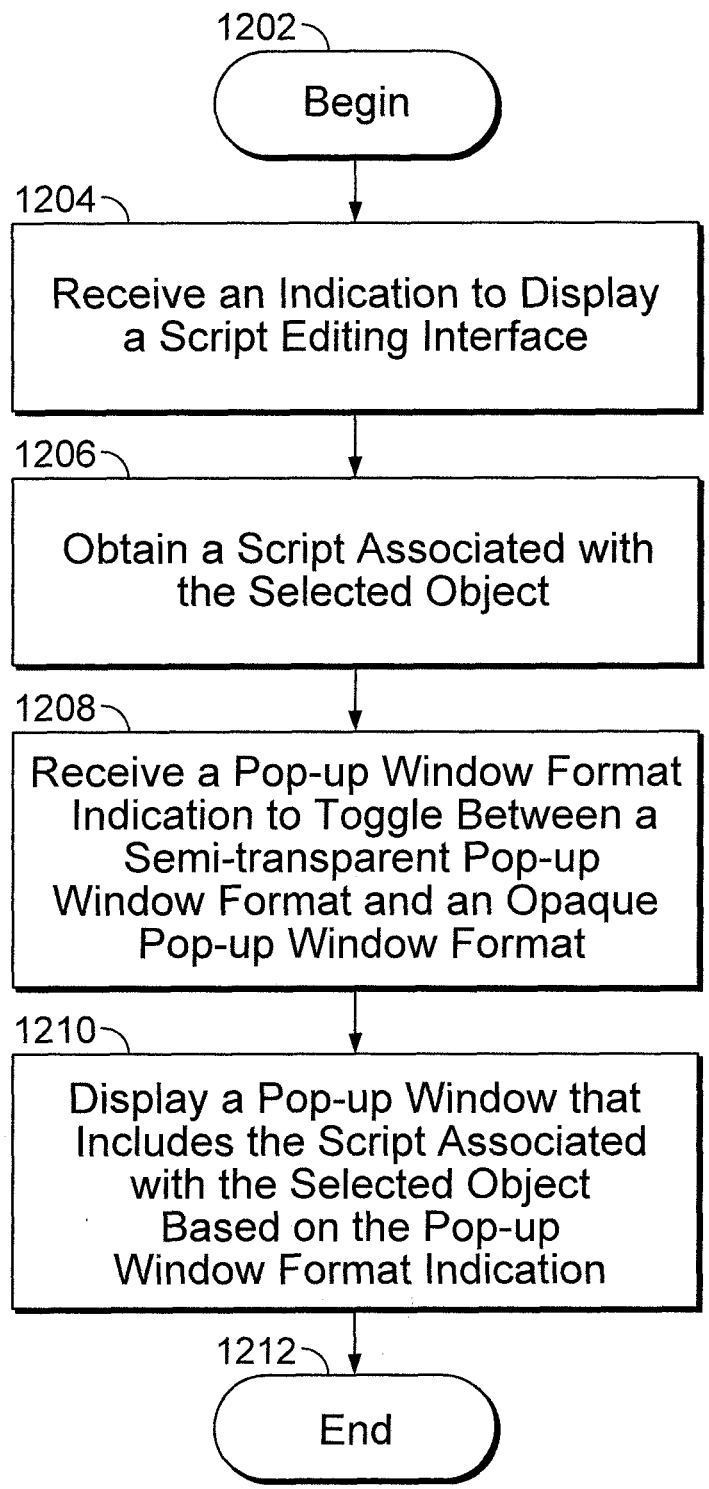
FIG. 12 is another flow chart for context sensitive script editing for form design in accordance with some embodiments.

FIG. 12 is another flow chart for context sensitive script editing for form design in accordance with some embodiments. At 1202, the process is initiated. At 1204, an indication to display a script editing interface is received (e.g., an indication can be triggered by a user of an editing application). In some embodiments, the indication includes a selected object within a sub-window of an editing application. In some embodiments, a form being edited includes a plurality of objects. In some embodiments, the form is edited using, for example, an editing application executed on a processor. At 1206, a script associated with the selected object is obtained. At 1208, a pop-up window format indication to toggle between a semi-transparent pop-up window format and an opaque pop-up window format is received (e.g., an indication can be triggered by a user of an editing application). At 1210, a pop-up window that includes the script associated with the selected object based on the pop-up window format indication is displayed. At 1212, the process is completed.

Although the foregoing embodiments have been described in some detail for purposes of clarity of understanding, the techniques are not limited to the details provided. There are many alternative ways of implementing the techniques. The disclosed embodiments are illustrative and not restrictive.

What is claimed is:

1. A system, comprising:
a processor configured to:
  display an object within a sub-window of an editing application that is associated with a script editing interface, wherein the object comprises two outer edges;
  receive an indication that the object has been selected;
  obtain a script associated with the object;
  display a pop-up window based at least in part on a pop-up window format indication to display a semi-transparent pop-up window or an opaque pop-up window, wherein the pop-up window includes the script associated with the object, and is displayed within the sub-window; and
  display a graphical link to visually associate the pop-up window and the object, wherein the graphical link comprises two arc connectors connected to the outer edges of the object; and
a memory coupled to the processor and configured to provide the processor with instructions.

2. The system recited in claim 1, wherein the processor is further configured to:
  obtain a set of events associated with the object, wherein the pop-up window further includes the set of events associated with the object displayed using a list format, and wherein a form being edited using the editing application includes a plurality of objects.

3. The system recited in claim 1, wherein the processor is further configured to:
  obtain a set of events;
  determine which events of the set of events are associated with the object; and
  display the events associated with the object using a list format in the pop-up window.

4. The system recited in claim 1, wherein the processor is further configured to:
  obtain a set of events;
  determine which events of the set of events are associated with the object; and
  display the events associated with the object using a list format in the pop-up window, wherein the events associated with the object are displayed using one or more visual indicators to differentiate from the events that are not associated with the object, and wherein the one or more visual indicators include different colors and graying out of events not associated with the object.

5. The system recited in claim 1, wherein the processor is further configured to:
  receive a selected event, wherein the script is further associated with the selected event, and the script can be edited within the pop-up window.

6. The system recited in claim 1, wherein the processor is further configured to:
  receive a selected event, wherein the script is further associated with the selected event, and wherein the selected event includes a last-selected event.

7. The system recited in claim 1, wherein the processor is further configured to:
  receive a selected event, wherein the script is further associated with the selected event, and wherein the selected event includes a first event in a hierarchy of events.

8. The system recited in claim 1, wherein the processor is configured to display the pop-up window including by maintaining a previous zoom value and a previous scroll position.

9. The system recited in claim 1, wherein the script includes a plurality of lines, and wherein the processor is further configured to:
  determine a size of the pop-up window based at least in part on the number of the plurality of lines of the script.

10. The system recited in claim 1, wherein the script includes a plurality of lines, and wherein the processor is further configured to:
  determine a location of the pop-up window within the sub-window based at least in part on the number of the plurality of lines of the script and based at least in part on a position of the object within the sub-window.

11. The system recited in claim 1, wherein the script includes a plurality of lines, and wherein the processor is further configured to:
    determine a size of the pop-up window based at least in part on the number of the plurality of lines of the script; and
    determine a location of the pop-up window within the sub-window based at least in part on the number of the plurality of lines of the script and based at least in part on a position of the object within the sub-window.

12. The system recited in claim 1, wherein the processor is further configured to:
    display the arc connectors using a transparent design without any color fill.

13. The system recited in claim 1, wherein the indication is triggered by a user of the editing application.

14. The system recited in claim 1, wherein the pop-up window is semitransparent.

15. The system recited in claim 1, wherein the processor is further configured to:
    receive a pop-up window format indication to toggle between a semi-transparent pop-up window format and an opaque pop-up window format; and
    display the pop-up window based on the pop-up window format indication.

16. A system, comprising:
    means for displaying an object within a sub-window of an editing application that is associated with a script editing interface, wherein the object comprises two outer edges;
    means for receiving an indication that the object has been selected;
    means for a obtaining script associated with the object;
    means for displaying a pop-up window based at least in part on a pop-up window format indication to display a semi-transparent pop-up window or an opaque pop-up window, wherein the pop-up window includes the script associated with the object, and is displayed within the sub-window; and
    means for displaying a graphical link to visually associate the pop-up window and the object, wherein the graphical link includes two arc connectors, wherein each arc connector is connected to one of the two outer edges of the object.

17. A method, comprising:
    displaying an object within a sub-window of an editing application that is associated with a script editing interface, wherein the object comprises two outer edges;
    receiving an indication that the object has been selected;
    obtaining a script associated with the selected object;
    displaying a pop-up window based at least in part on a pop-up window format indication to display a semi-transparent pop-up window or an opaque pop-up window, wherein the pop-up window includes the script associated with the selected object, and is displayed within the sub-window; and
    displaying a graphical link to visually associate the pop-up window and the selected object, wherein the graphical link includes two arc connectors, wherein each arc connector is connected to one of the two outer edges of the object.

18. The method recited in claim 17, wherein the obtaining a script associated with the selected object is executed on a processor.

19. A computer program product, the computer program product being embodied in a non-transitory computer readable storage medium and comprising computer instructions for:
    displaying an object within a sub-window of an editing application that is associated with a script editing interface, wherein the object comprises two outer edges;
    receiving an indication that the object has been selected;
    obtaining a script associated with the selected object;
    displaying a pop-up window based at least in part on a pop-up window format indication to display a semi-transparent pop-up window or an opaque pop-up window, wherein the pop-up window includes the script associated with the selected object, and is displayed within the sub-window; and
    displaying a graphical link to visually associate the pop-up window and the selected object, wherein the graphical link includes two arc connectors, wherein each arc connector is connected to one of the two outer edges of the object.

20. The method according to claim 1, wherein the two arc connectors are concaved.

* * * * *